US009900773B2

(12) United States Patent
Bae et al.

(10) Patent No.: US 9,900,773 B2
(45) Date of Patent: Feb. 20, 2018

(54) ELECTRONIC APPARATUS AND CONTROL METHOD THEREOF

(71) Applicant: SAMSUNG ELECTRONICS CO., LTD., Suwon-si (KR)

(72) Inventors: Ju-han Bae, Gwacheon-si (KR); Yong-jin Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/281,854

(22) Filed: Sep. 30, 2016

(65) Prior Publication Data

US 2017/0019790 A1 Jan. 19, 2017

Related U.S. Application Data

(63) Continuation of application No. 14/808,075, filed on Jul. 24, 2015, now Pat. No. 9,485,657.

(30) Foreign Application Priority Data

Dec. 5, 2014 (KR) .......................... 10-2014-0174091

(51) Int. Cl.
*H04W 12/06* (2009.01)
*H04L 12/28* (2006.01)
(Continued)

(52) U.S. Cl.
CPC ......... *H04W 12/06* (2013.01); *H04L 12/2816* (2013.01); *H04W 12/04* (2013.01);
(Continued)

(58) Field of Classification Search
CPC ....... H04L 12/2816; H04L 2012/2849; H04W 12/04; H04W 12/06; H04W 60/04; H04W 84/12; H04W 88/08
(Continued)

(56) References Cited

U.S. PATENT DOCUMENTS 8,577,392 B1 * 11/2013 Pai .......................... H04L 67/18
455/404.2
8,649,804 B2 * 2/2014 Yoo ......................... H04W 4/02
455/404.2
(Continued)

FOREIGN PATENT DOCUMENTS

EP  2424297 A1  2/2012
EP  2 661 144 A2  11/2013
(Continued)

OTHER PUBLICATIONS

Communication dated Apr. 8, 2016 issued by the European Patent Office in counterpart European Patent Application No. 15194469.1.
(Continued)

*Primary Examiner* — Babar Sarwar
(74) *Attorney, Agent, or Firm* — Sughrue Mion, PLLC

(57) ABSTRACT

An electronic apparatus and a control method thereof are disclosed. The electronic apparatus according includes: a first communicator configured to communicate with an authentication terminal device; a second communicator configured to communicate with a new terminal device that is not registered with an access point (AP); a storage configured to store authentication information for accessing the AP; and a controller configured to control the second communicator to transmit the authentication information that is stored in the storage to the new terminal device in response to receiving terminal information of the new terminal device from the authentication terminal device through the first communicator.

14 Claims, 11 Drawing Sheets

(51) Int. Cl.
*H04W 12/04* (2009.01)
*H04W 60/04* (2009.01)
*H04W 84/12* (2009.01)
*H04W 88/08* (2009.01)

(52) U.S. Cl.
CPC ..... *H04W 60/04* (2013.01); *H04L 2012/2849* (2013.01); *H04W 84/12* (2013.01); *H04W 88/08* (2013.01)

(58) Field of Classification Search
USPC ........ 455/4.2, 411, 412.1–414.2, 418–422.1, 455/41.1–41.2, 456.1, 452.1, 450, 435.1, 455/435.2; 370/328–332, 338, 348, 341
See application file for complete search history.

(56) References Cited

U.S. PATENT DOCUMENTS

| | | | |
|---|---|---|---|
| 8,823,494 B1* | 9/2014 | Kovitz | H01Q 1/2225 340/10.1 |
| 2009/0310583 A1* | 12/2009 | Suzuki | H04W 88/02 370/338 |
| 2009/0323659 A1* | 12/2009 | Zhang | H04W 76/023 370/338 |
| 2011/0039494 A1* | 2/2011 | Shon | H04W 8/005 455/41.1 |
| 2011/0106279 A1 | 5/2011 | Cho et al. | |
| 2011/0256850 A1* | 10/2011 | Selander | H04W 12/08 455/411 |
| 2013/0231088 A1 | 9/2013 | Jabara | |
| 2013/0324031 A1 | 12/2013 | Loureiro | |
| 2014/0007211 A1* | 1/2014 | Yang | H04L 63/08 726/7 |
| 2014/0119234 A1* | 5/2014 | Kwon | H04W 76/025 370/254 |
| 2014/0167931 A1 | 6/2014 | Lee et al. | |
| 2014/0169274 A1 | 6/2014 | Kweon et al. | |
| 2014/0185842 A1* | 7/2014 | Kang | H04R 5/02 381/303 |
| 2014/0233755 A1* | 8/2014 | Kim | H04R 3/00 381/77 |
| 2014/0320585 A1* | 10/2014 | Igoe | H04L 12/2809 348/14.04 |
| 2014/0342670 A1 | 11/2014 | Kang et al. | |
| 2015/0244876 A1* | 8/2015 | Jabara | H04W 12/06 455/406 |

FOREIGN PATENT DOCUMENTS

| | | |
|---|---|---|
| EP | 2 725 850 A2 | 4/2014 |
| EP | 2 747 375 A1 | 6/2014 |

OTHER PUBLICATIONS

International Search Report dated Nov. 18, 2015 issued by International Searching Authority in counterpart International Patent Application PCT/KR2015/007615.
Written Opinion dated Nov. 18, 2015, issued by International Search Report in counterpart International Patent Application No. PCT/KR2015/007615.
Communication dated Jul. 28, 2017 by the European Patent Office in counterpart European Patent Application No. 15194469.1.

* cited by examiner

<u>300</u>

ELECTRONIC APPARATUS AND CONTROL METHOD THEREOF

CROSS-REFERENCE TO RELATED APPLICATION(S)

This application is a continuation application of U.S. patent application Ser. No. 14/808,075, filed on Jul. 24, 2015, which claims priority from Korean Patent Application No. 10-2014-0174091, filed on Dec. 5, 2014, in the Korean Intellectual Property Office, the disclosures of which are incorporated herein in its entirety by reference.

BACKGROUND

Field

Apparatuses and methods consistent with exemplary embodiments relate to an electronic apparatus and a control method thereof, and more particularly, to an electronic apparatus and a control method thereof for setting a home network.

Description of the Related Art

As electronic devices with the capability to communicate over wireless networks come into wide use, requirements to configure a home network to allow these devices to use the network are increasing. However, the process of configuring an electronic device to be able to be used on a home network can be difficult.

That is, in order for the user to use a plurality of electronic devices on a home network, the user is required to register the respective electronic devices with a wireless router, such as an access point (AP). In general, a method of registering the electronic device with the AP involves setting authentication information, including subsystem identification (SSID) and key information, in the AP by inputting the information in (GUI) screen of the corresponding electronic device. However, if the electronic device to be added to the network does not support such a GUI screen, the user must perform a setting so that wireless communications are enabled between another electronic device that does support the GUI screen and the corresponding electronic device. Then, the electronic device that does not support the GUI screen can be registered with the AP by using the other electronic device that does support the GUI screen.

For example, in order to output an audio signal output from a display device such as a smart television (TV) through a wireless speaker, the user must perform a registration setting so that the display device and the wireless speaker access the AP.

However, since a user that is unacquainted with the registration setting of the electronic device may be unable to register the electronic device with the AP, there is a problem that the user will not be able to use a home network service through the electronic device.

SUMMARY

Exemplary embodiments overcome the above disadvantages and other disadvantages not described above. However, not all exemplary embodiments are required to overcome the disadvantages described above, and an exemplary embodiment may not necessarily overcome any of the problems described above.

Exemplary embodiments provide an easier home network configuration for an electronic apparatus.

According to an aspect of an exemplary embodiment, there is provided an electronic apparatus including: a first communicator configured to communicate with an authentication terminal device; a second communicator configured to communicate with a new terminal device that is not registered with an access point (AP); a storage configured to store authentication information for accessing the AP; and a controller configured to control the second communicator to transmit the authentication information that is stored in the storage to the new terminal device in response to receiving terminal information of the new terminal device from the authentication terminal device through the first communicator.

The controller may be configured to control the first communicator to receive the terminal information of the new terminal device from the authentication terminal device in response to the new terminal device being located within a preset distance from the authentication terminal device.

The controller may be configured to generate list information regarding at least one terminal device retrieved through the second communicator and to transmit the generated list information to the authentication terminal device, and the controller may be configured to control the first communicator to receive terminal information of a selected new terminal device from the authentication terminal device in response to a user selection of the new terminal device among the at least one terminal device included in the list information.

The authentication information may include subsystem identification (SSID) and key information for accessing the AP.

The electronic apparatus may further include: a detector configured to detect whether at least one terminal device is located within a preset threshold distance; and a display, wherein the controller is configured to control the second communicator to transmit a signal to the new terminal device requesting the terminal information of the new terminal device in response to detecting that the new terminal device is located within the preset threshold distance, and the controller is configured to control the display to display a list user interface (UI) for a terminal device that is registered with the AP when the terminal information of the new terminal device is received through the second communicator.

The controller may be configured to control the first communicator to transmit the terminal information of the new terminal device to a first terminal device in response to a selection instruction for the first terminal device among terminal devices included in the displayed list UI being input.

The electronic apparatus may further include a display, wherein the controller may be configured to control the display to display a list UI based on received list information in response to receiving the list information from a second terminal device that is registered with the AP, and the controller may be configured to control the first communicator to transmit the terminal information of the new terminal device to the second terminal device in response to a selection instruction for the new terminal device being input based on the displayed list UI.

The list information may be information regarding a data communications enabled terminal device retrieved by the second terminal device.

According to an aspect of another exemplary embodiment, there is provided a control method of an electronic apparatus, the control method including: receiving terminal information of a new terminal device from an authentication terminal device that is registered with an access point (AP); and transmitting stored authentication information to the new terminal device based on the received terminal information of the new terminal device.

The receiving of the terminal information may include receiving the terminal information of the new terminal device from the authentication terminal device in response to the new terminal device being located within a preset distance from the authentication terminal device.

The control method may further include: retrieving terminal devices that are able to communicate with the electronic apparatus; and generating list information at least one terminal device that is retrieved and transmitting the generated list information to the authentication terminal device, wherein the receiving the terminal information includes receiving terminal information of a selected new terminal device from the authentication terminal device in response to a user selection of the new terminal device among the at least one terminal device included in the list information.

The authentication information may include subsystem identification (SSID) and key information for accessing the AP.

The control method may further include: determining whether at least one terminal device is located within a preset threshold distance; transmitting a signal to the new terminal device requesting the terminal information of the new terminal device in response to determining that the new terminal device is located within in the preset threshold distance; and displaying a list user interface (UI) for a terminal device that is registered with the AP in response to receiving the terminal information of the new terminal device.

The control method may further include: transmitting the terminal information of the new terminal device to a first terminal device in response to a selection instruction for the first terminal device among the terminal devices included in the displayed list UI being input.

The control method may further include: displaying a list UI based on received list information in response to receiving the list information from a second terminal device that is registered with the AP; and transmitting the terminal information of the new terminal device to the second terminal device in response to a selection instruction for the new terminal device being input based on the displayed list UI.

The list information may be information regarding a data communications enabled terminal device retrieved by the second terminal device.

According to another aspect of an exemplary embodiment, an electronic apparatus includes: a communicator configured to communicate with at least one terminal device; and a controller configured to transmit terminal information of the electronic apparatus to a first terminal device in response to receiving a signal requesting the terminal information of the electronic apparatus from the first terminal device through the communicator, and to perform an authentication process for an access point (AP) registration based on the received authentication information in response to the authentication information for the AP registration being received from a second terminal device.

The first and second terminal devices may be terminal devices that are registered with the AP.

According to an aspect of another exemplary embodiment, there is provided a control method of an electronic apparatus, the control method including: receiving a signal requesting terminal information of the electronic apparatus from a first terminal device; transmitting the terminal information of the electronic apparatus to the first terminal device in response to receiving the signal requesting the terminal information of the electronic apparatus; receiving authentication information for an access point (AP) registration from a second terminal device; and performing an authentication process for the AP registration based on the received authentication information.

The first and second terminal devices may be terminal devices that are registered with the AP.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Hereinafter, exemplary embodiments will be described in more detail with reference to the accompanying drawings.

Figure 1:
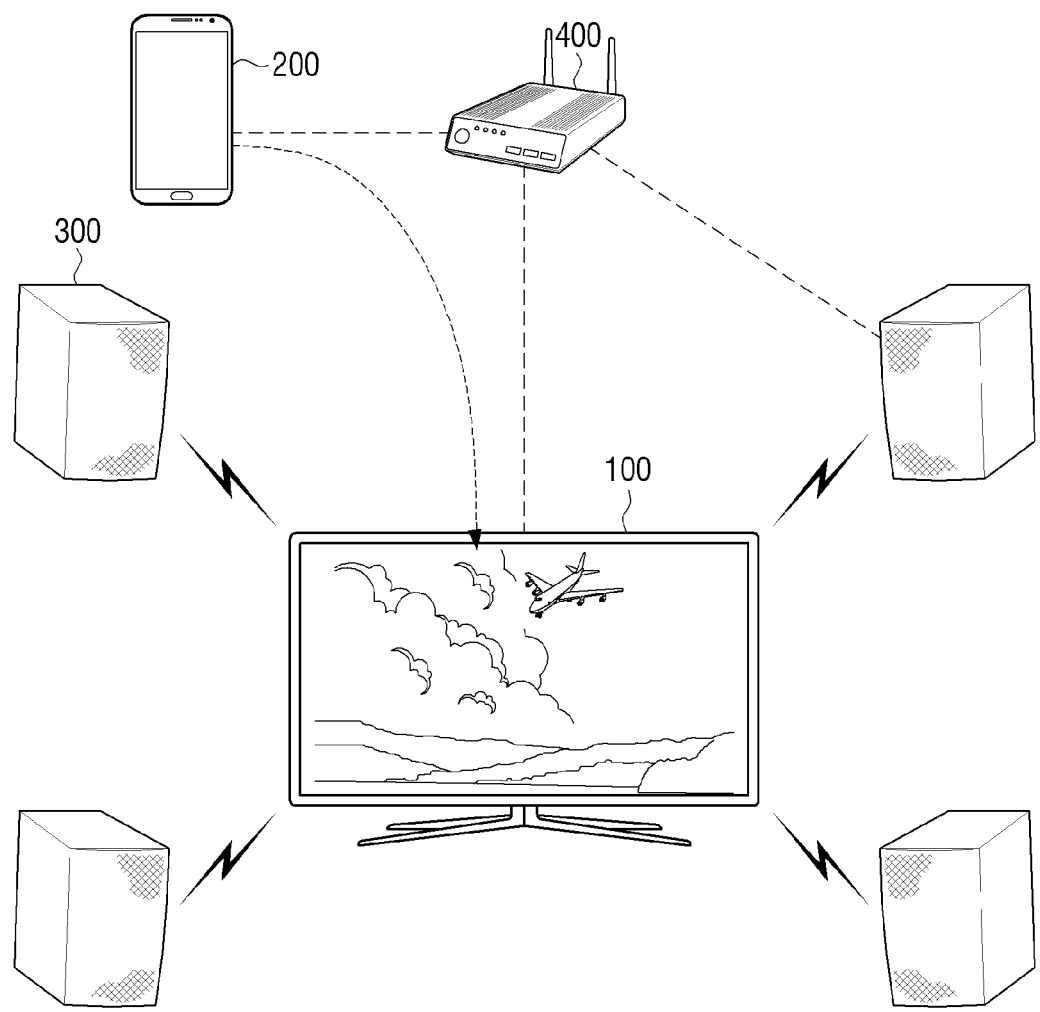
FIG. 1 is a system diagram illustrating a home network system according to an exemplary embodiment.

FIG. 1 is a system diagram illustrating a home network system according to an exemplary embodiment.

As illustrated in FIG. 1, the home network system is a data communications enabled system that includes a plurality of terminal devices that communicate through an access point (AP) 400 on a home network. The home network system includes an electronic apparatus 100, a peripheral device 200, and the access point (AP) 400. Here, the electronic apparatus 100 and the peripheral device (hereinafter, referred to as an authentication terminal device) 200 may be a smart television (TV), a smartphone, a personal computer (PC), a notebook PC, a tablet PC, an audio output apparatus such as a wireless speaker, and the like. The electronic apparatus 100 and the authentication terminal device 200 may be registered with the AP 400 to enable data communication to be performed through the AP 400.

Meanwhile, the home network system according to an exemplary embodiment may register a new terminal device 300 with the AP 400 through the following procedure in order to perform data communication between at least one of the electronic apparatus 100 and the authentication terminal device 200, which are registered with the AP 400, and the new terminal device 300, which is not registered with the AP 400. After registration, the new terminal device 300 may then perform data communication between at least one of the electronic apparatus 100 and the authentication terminal device 200 through the AP 400.

Figure 2:
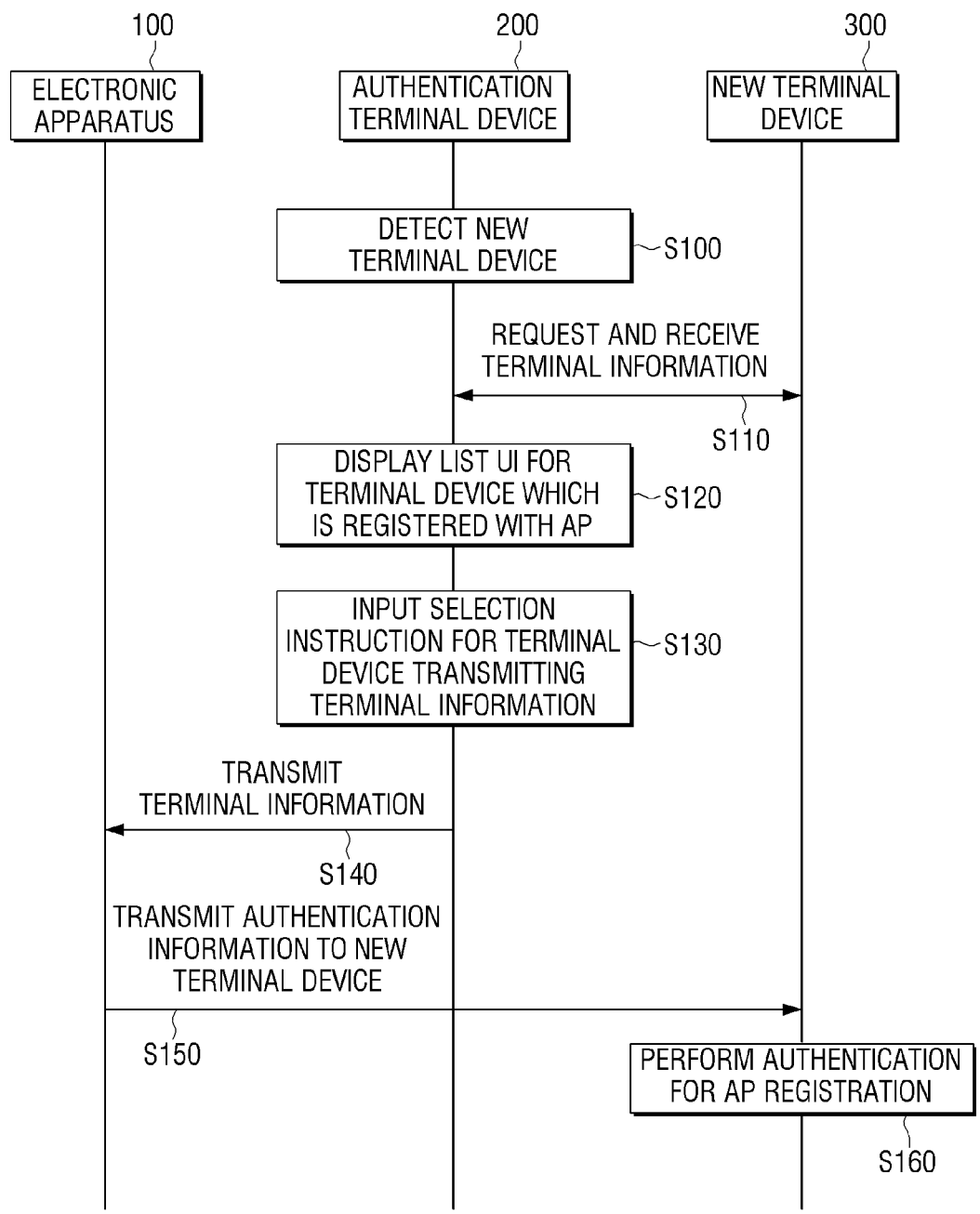
FIG. 2 is a flow diagram illustrating a method for a home network setting of a new terminal device in a home network system according to an exemplary embodiment.

FIG. 2 is a flow diagram illustrating a method for a home network configuration of the new terminal device in the home network system according to an exemplary embodiment.

As illustrated in FIG. 2, the electronic apparatus 100 and the authentication terminal device 200 that are registered with the AP in the home network system may perform data communication on the same home network through the AP 400. Meanwhile, the home network system may perform a home network configuration for the new terminal device 300 through the following procedure in order for the new terminal device 300, which is not registered with the AP 400, to perform data communication on the same home network as the electronic apparatus 100 and the authentication terminal device 200, which are registered with the AP 400.

Specifically, in order to perform the home network configuration for the new terminal device 300, the authentication terminal device 200, which is registered with the AP 400, detects whether or not the new terminal device 300 is present within a preset distance of the AP 400 or is in contact with the AP 400 (S100).

If it is detected that the new terminal device 300 is present within the preset distance or in contact with the AP 400, the authentication terminal device 200 requests terminal information of the new terminal device 300 from the new terminal device 300 through a local area wireless communication scheme and receives the terminal information (S110). Here, the terminal information may include address information, identification information, product information, and the like of the new terminal device 300.

When the terminal information of the new terminal device 300 is received, the authentication terminal device 200 displays a list user interface (UI) for one or more terminal devices on a screen (S120). Here, one or more terminal devices included in the list UI may be the terminal device registered with the AP 400. The user may select the terminal devices from the list UI displayed on the screen of the authentication terminal device 200 to which the terminal information of the new terminal device 300 is to be transmitted. When the selection instruction is input from the user for the electronic apparatus 100 among one or more terminal devices included in the list UI (S130), the authentication terminal device 200 transmits the terminal information of the new terminal device 300 to the electronic apparatus 100 according to the input selection instruction (S140).

When the electronic apparatus 100 receives the terminal information of the new terminal device 300 from the authentication terminal device 200, the electronic apparatus 100 transmits pre-stored authentication information to the new terminal device 300 based on the received terminal information (S150). Here, the authentication information, which is information for accessing AP 400, may include subsystem identification (SSID) and key information. When the new terminal device 300 receives the authentication information for accessing the AP 400 from the electronic apparatus 100, the new terminal device 300 performs authentication for AP 400 registration based on the received authentication information (S160).

Specifically, the new terminal device 300 transmits the authentication information to the AP 400 to request the AP 400 registration. Therefore, the AP 400 determines whether or not the authentication information received from the new terminal device 300 matches the pre-stored authentication information to determine whether or not the new terminal device 300 is registered.

When the new terminal device 300 is registered with the AP 400 through the procedures described above, the new terminal device 300 may perform data communication with at least one of the electronic apparatus 100 and the authentication terminal device 200 through the AP 400.

Figure 3:
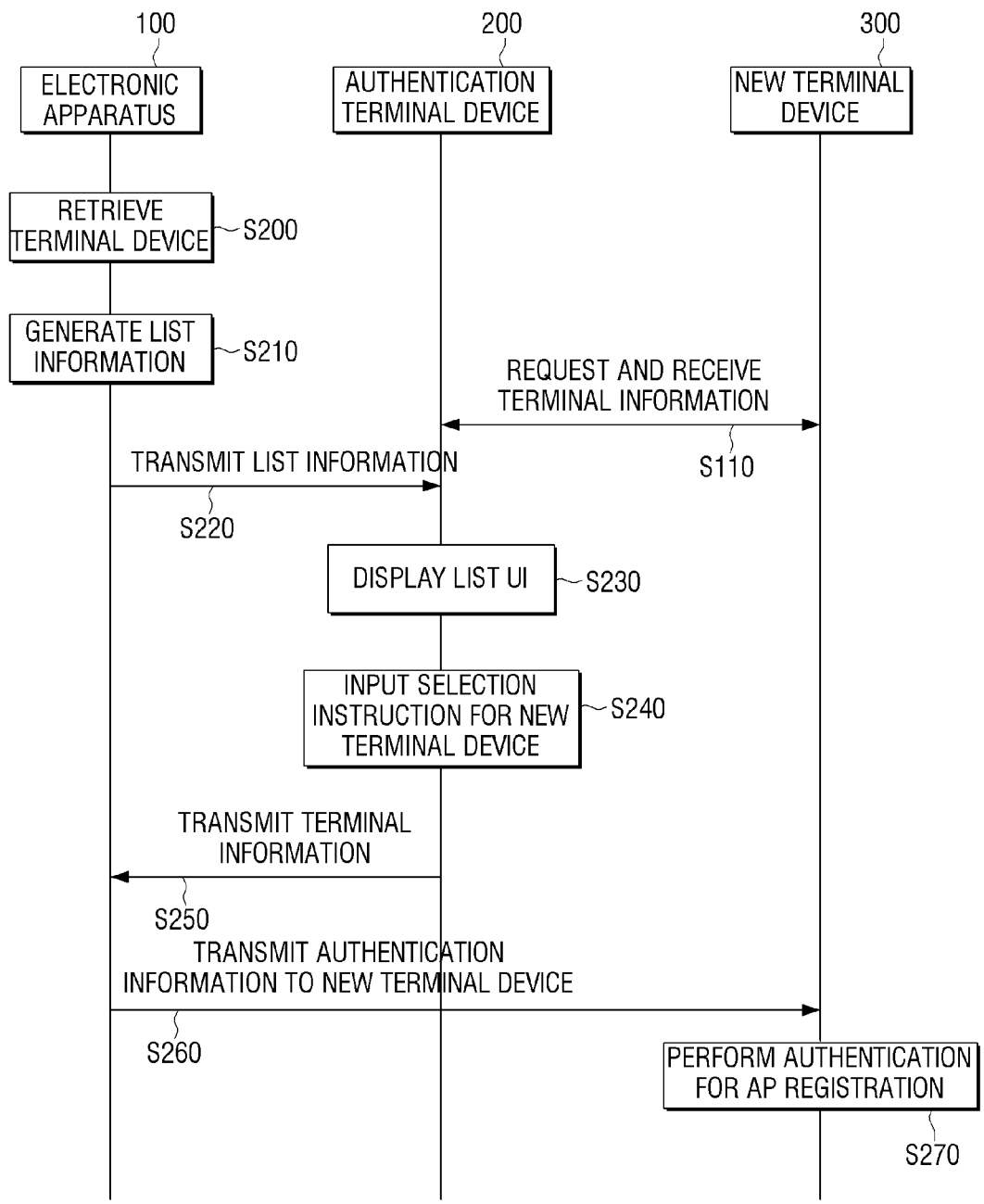
FIG. 3 is a flow diagram illustrating a method for a home network setting of a new terminal device in a home network system according to another exemplary embodiment.

FIG. 3 is a flow diagram for setting a home network of a new terminal device in a home network system according to another exemplary embodiment.

As illustrated in FIG. 3, the electronic apparatus 100 and the authentication terminal device 200, which are both registered with the AP 400 in the home network system, may perform data communication on the home network through the AP 400. Meanwhile, the home network system may perform a home network configuration for the new terminal device 300 through the following procedure so that the new terminal device 300, which is not registered with the AP 400, may perform data communication on the home network.

Specifically, in order to perform the home network configuration for the new terminal device 300, the electronic apparatus 100 performs a retrieval for one or more terminal devices which are within a radius of wireless communications (S200). According to an exemplary embodiment, the electronic apparatus 100 transmits a signal for a terminal information request of the terminal device in a broadcast scheme. Therefore, one or more terminal devices that are within the radius of wireless communications of the electronic apparatus 100 transmit the terminal information to the electronic apparatus 100. When the electronic apparatus 100 receives the terminal information of the corresponding terminal devices from one or more terminal devices, the electronic apparatus 100 generates list information for one or more terminal devices that are within the radius of wireless communications of the electronic apparatus 100 based on the received terminal information (S210) and transmits the list information to the authentication terminal device 200 (S220).

The authentication terminal device 200 receiving the list information from the electronic apparatus 100 generates a list UI based on the received list information and displays the generated list UI on a screen (S230). Therefore, the user may select the new terminal device 300 for the home network setting from the list UI displayed on the screen of the authentication terminal device 200. When a selection instruction for the new terminal device 300 described above is input, the authentication terminal device 200 transmits the terminal information on the new terminal device 300 corresponding to the selection instruction to the electronic apparatus 100 (S250). Then, the electronic apparatus 100 transmits pre-stored authentication information to the new terminal device 300 based on the terminal information received from the authentication terminal device 200 (S260). Here, the authentication information, which is information for accessing the AP 400, may include subsystem identification (SSID) and key information. When the new terminal device 300 receives the authentication information for the AP 400 access from the electronic apparatus 100, the new terminal device 300 performs authentication for registering with AP 400 based on the received authentication information (S270).

Specifically, the new terminal device 300 transmits the authentication information to the AP 400 to request registration with the AP 400. Therefore, the AP 400 determines whether or not the authentication information received from the new terminal device 300 matches the pre-stored authentication information in order to determine whether or not the new terminal device 300 is registered with the AP 400.

When the new terminal device 300 is registered with the AP 400 through the procedures described above, the new terminal device 300 may perform data communication with at least one of the electronic apparatus 100 and the authentication terminal device 200 through the AP 400.

As such, the home network system according to exemplary embodiments performs the AP 400 registration of the new terminal device 300, which is not registered with the AP 400, by using the authentication information of the electronic apparatus 100 that is pre-registered with the AP 400, thereby making it possible to more easily perform the home network configuration to add the corresponding new terminal device 300 to the network.

Hereinafter, the respective configurations of the electronic apparatus 100 described above will be described in detail.

Figure 4:
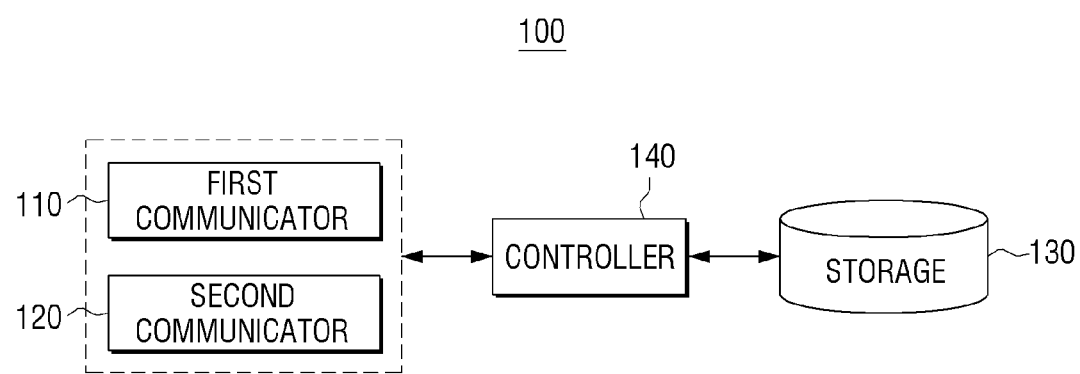
FIG. 4 is a block diagram of an electronic apparatus according to an exemplary embodiment.

FIG. 4 is a block diagram of an electronic apparatus according to an exemplary embodiment.

As illustrated in FIG. 4, the electronic apparatus 100 includes a first communicator 110, a second communicator 120, a storage 130, and a controller 140.

The first communicator 110 performs data communication with the authentication terminal device 200, which is registered with the AP 400. According to an exemplary embodiment, the first communicator may be implemented in a local area wireless communications module such as a wireless-fidelity (Wi-Fi) module. Therefore, the first communicator 110 may perform the data communication with the authentication terminal device 200, which is registered with the AP 400, through the AP 400.

The second communicator 120 performs data communication with the new terminal device 300, which is not registered with the AP 400. However, the second communicator 120 is not limited to communicating with the new terminal device 300, and in other exemplary embodiments the second communicator 120 may wirelessly perform data communication with the authentication terminal device, which is registered with the AP 400, as well as the new terminal device 300, which is not registered with the AP 400. That is, the second communicator 120 may directly perform data communication with one or more terminal devices that are within a coverage area. The second communicator 120 described above may be implemented in a local area communications module such as a Bluetooth module, a Zigbee module, or a near field communication (NFC) module, according to an exemplary embodiment.

The storage 130 stores authentication information for an AP 400 access. Here, the authentication information, which is information for the AP 400 access, may include subsystem identification (SSID) and key information. The storage 130 that stores the authentication information described above, which is a storage medium in which a variety of programs required for operating the electronic apparatus 100 are stored, may be implemented in a memory, a hard disk drive (HDD), and the like. For example, the storage 130 may include read only memory (ROM) storing a program for executing an operation of the controller 140, random access memory (RAM) temporarily storing data according to the operation execution of the controller 140, and the like. Also, the storage 130 may include electrically erasable and programmable ROM (EEPROM) storing a variety of reference data.

The controller 140 generally controls operations of the respective components configuring the electronic apparatus 100. Particularly, when the controller 140 receives the terminal information of the new terminal device 300 from the authentication terminal device 200 through the first communicator 110, the controller 140 controls the second communicator 120 to transmit authentication information which is pre-stored in the storage 130 to the new terminal device 300 based on the received terminal information of the new terminal device 300. Here, the terminal information may include address information, identification information, product information, and the like of the new terminal device 300. Therefore, the second communicator 120 may transmit the authentication information to the new terminal device 300 based on the terminal information of the new terminal device 300, according to a control instruction of the controller 140.

The controller 140 may receive the terminal information on the new terminal device 300 from the authentication terminal device 200.

According to an exemplary embodiment, if the new terminal device 300 is located within a preset distance from the authentication terminal device 200 and the authentication terminal device 200 receives the terminal information of the new terminal device 300, the controller 140 may control the first communicator 110 to receive the terminal information of the new terminal device 300 from the authentication terminal device 200. Therefore, the first communicator 110 receives the terminal information of the new terminal device 300 from the authentication terminal device 200 and the controller 140 controls the second communicator 120 to transmit the pre-stored authentication information for the AP 400 access to the new terminal device 300 based on the terminal information received from the authentication terminal device 200.

Specifically, the authentication terminal device 200 detects whether or not one or more terminal devices are present within a preset distance or are in contact with the authentication terminal device 200. As a result of the detection, if the new terminal device 300 is present within the preset distance or is in contact with the authentication terminal device 200, the authentication terminal device 200 transmits a signal to the new terminal device 300 requesting the terminal information of the new terminal device 300. Then, the new terminal device 300 transmits its own terminal information to the authentication terminal device 200 and the authentication terminal device 200 transmits the terminal information received from the new terminal device 300 to the electronic apparatus 100.

If the terminal information of the new terminal device 300 described above is received through the first communicator 110, the controller 140 controls the second communicator 120 to transmit the pre-stored authentication information for accessing the AP 400 to the new terminal device 300 based on the terminal information received from the authentication terminal device 200. Therefore, the second communicator 120 may transmit the authentication information to the new terminal device 300 based on the terminal information of the new terminal device 300.

According to another exemplary embodiment, the controller 140 generates list information on one or more terminal devices retrieved through the second communicator 120 and transmits the list information to the authentication terminal device 200. Thereafter, if the user selects the new terminal device 300 among one or more terminal devices included in the list information, the controller 140 may control the first communicating unit 110 to receive the terminal information of the new terminal device 300 from the authentication terminal device 200. According to the control instruction described above, the first communicating unit 110 receives the terminal information of the new terminal device 300 and the controller 140 controls the second communicator 120 to transmit the pre-stored authentication information for the AP 400 access to the new terminal device 300 based on the terminal information received from the authentication terminal device 200.

Specifically, the controller 140 controls the second communicator 120 to perform the retrieval for one or more terminal devices that are within the radius of wireless communication. Therefore, the second communicator 120 transmits a signal for a terminal information request of the terminal device in a broadcast scheme. Therefore, one or more terminal devices receiving the signal for the terminal information request transmit the terminal information to the electronic apparatus 100. If the terminal information of one or more terminal devices is received through the second communicator 120, the controller 140 temporarily stores the received terminal information in the storage 130 and generates list information on one or more terminal devices that are within the radius of wireless communication of the electronic apparatus 100 based on the received terminal information. Thereafter, the controller 140 controls the first communicator 110 to transmit the list information to the authentication terminal device 200. According to the control instruction described above, the first communicator 110 transmits the list information to the authentication terminal device 200, and the authentication terminal device 200 generates a list UI based on the received list information and displays the list UI on a screen. Therefore, if the user inputs a selection instruction for the new terminal device 300 from the list UI displayed on the authentication terminal device 200, the authentication terminal device 200 transmits the terminal information of the new terminal device 300 according to the input selection instruction to the electronic apparatus 100. Here, the terminal information of the new terminal device 300 may be identification information on the new terminal device 300.

If the identification information described above is received through the first communicator 110, the controller 140 controls the second communicator 120 to obtain the terminal information including the received identification information with reference to the terminal information which is temporarily stored in the storage 130 and transmit the pre-stored authentication information for the AP 400 access to the new terminal device 300 based on the obtained terminal information. Therefore, the second communicator 120 may transmit the authentication information to the new terminal device 300 based on the terminal information of the new terminal device 300. Although the first communicator 110 and second communicator 120 are described as performing different operations, in other exemplary embodiments a single communicator may be utilized to perform the operations of the first communicator 110 and second communicator 120.

If the authentication information is transmitted to the new terminal device 300 through various exemplary embodiments described above, the new terminal device 300 performs an authentication for registration with AP 400 based on the received authentication information. Specifically, the new terminal device 300 transmits the authentication information to the AP 400 to request registration with the AP 400. Therefore, the AP 400 determines whether or not the authentication information received from the new terminal device 300 matches the pre-stored authentication information to determine whether or not the new terminal device 300 is registered.

When the new terminal device 300 is registered with the AP 400 through the procedures described above, the new terminal device 300 may perform data communication with at least one of the electronic apparatus 100 and the authentication terminal device 200 through the AP 400.

In addition, the electronic apparatus 100 described above may perform an operation for the authentication terminal device 200 according to user instruction.

Figure 5:
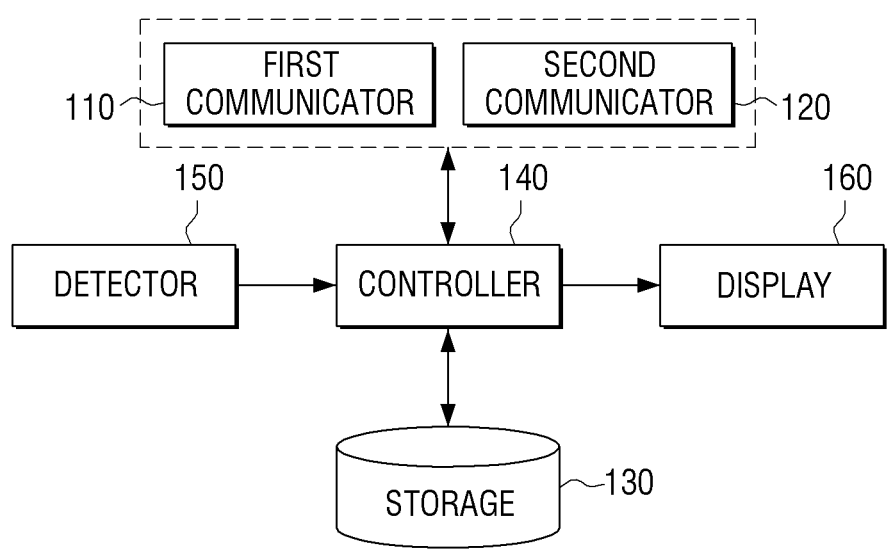
FIG. 5 is a detailed block diagram of the electronic apparatus according to the exemplary embodiment.

FIG. 5 is a detailed block diagram of the electronic apparatus according to the exemplary embodiment.

As illustrated in FIG. 5, the electronic apparatus 100 may further include a detector 150 and a display 160, in addition to the first communicator 110 and second communicator 120, the storage 130, and the controller 140.

The detector 150 detects whether or not one or more terminal devices are present within a preset threshold distance or are in contact with the electronic apparatus 100. The display 160 displays content and the list UI for the terminal device. The display 160 described above may be implemented as a liquid crystal display (LCD), an organic light emitting display (OLED), a plasma display panel (PDP), or the like. As well, the display 160 may be implemented as a touch panel to receive a touch instruction from the user.

When the electronic apparatus 100 operates as the authentication terminal device 200, the controller 140 may receive the terminal information of the new terminal device 300 and transmit the received terminal information to one or more terminal devices that are registered with the AP 400.

According to an exemplary embodiment, if the new terminal device 300 is detected as being located within the preset threshold distance, the controller 140 controls the second communicator 120 to transmit a signal requesting the terminal information of the new terminal device 300 to the new terminal device 300. Therefore, the second communicator 120 may transmit the signal requesting the terminal information of the new terminal device 300 to the new terminal device 300. Thereafter, if the terminal information of the new terminal device 300 is received through the second communicator 120, the controller 140 controls the display 160 to display the list UI for the terminal device that is registered with AP 400.

According to the control instruction described above, the display 160 may display the list UI for the terminal device that is registered with AP 400 and the user may select the terminal device that the terminal information of the new terminal device 300 will be transmitted to from the list UI displayed by the display 160. If the user inputs the selection instruction to select a first terminal device among one or more terminal devices included in the list UI, the controller 140 controls the first communicator 110 to transmit the terminal information of the new terminal device 300 to the first terminal device. Therefore, the first communicator 110 may transmit the terminal information of the new terminal device 300 to the first terminal device through the AP 400 and the first terminal device may transmit the pre-stored authentication information for accessing the AP 400 to the new terminal device 300 based on the terminal information of the new terminal device 300 received through the AP 400.

According to another exemplary embodiment, the first communicator 110 may receive the list information from a second terminal device among one or more terminal devices that are registered with the AP 400. Here, the list information received from the second terminal device is information retrieved by the second terminal device on one or more terminal devices that are within the radius of wireless communications. If the list information described above is received, the controller 140 generates the list UI based on the received list information and controls the display 160 to display the generated list UI. Therefore, the display 160 may display the list UI and the user may select the new terminal device 300 transmitting the authentication information from the list UI. As such, if the selection instruction for the new terminal device 300 is input, the controller 140 controls the first communicator 110 to transmit the terminal information for the new terminal device to the second terminal device. According to the control instruction, the first communicator 110 transmits the terminal information on the new terminal device to the second terminal device through the AP 400. Here, the terminal information on the new terminal device may be identification information.

The second terminal device may obtain the terminal information associated with the identification information on the new terminal device received from the electronic apparatus 100 with reference to the terminal information on one or more terminal devices that are temporarily stored and are within the radius of wireless communications. The second terminal device may then transmit the pre-stored authentication information to the new terminal device 300 based on the obtained terminal information.

Hereinafter, the respective configurations of the new terminal device 300 described above will be described in detail.

Figure 6:
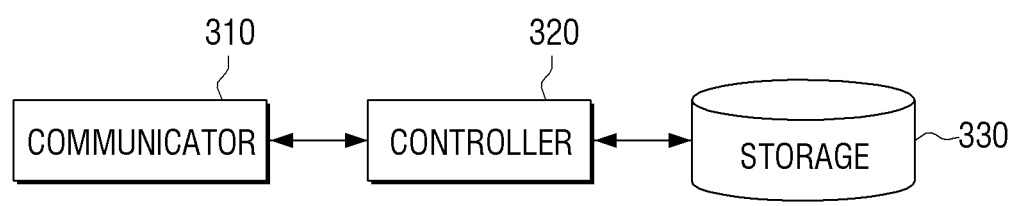
FIG. 6 is a block diagram of an electronic apparatus which is not registered with an access point (AP) according to an exemplary embodiment.

FIG. 6 is a block diagram of an electronic apparatus that is not registered with an access point (AP) according to an exemplary embodiment.

As illustrated in FIG. 6, the electronic apparatus is the new terminal device 300 described above, and the new terminal device 300 includes a communicator 310, a controller 320, and a storage 330.

The communicator 310 performs data communications with one or more terminal devices. According to an exemplary embodiment, the communicator 310 may include at least one of a first communicating module (not illustrated) performing the data communications with one or more terminal devices which are located within the radius of wireless communications and a second communicating module (not illustrated) performing the data communications with one or more terminal devices through the AP 400.

If the controller 320 receives a signal requesting the terminal information on the new terminal device 300 from the first terminal device through the communicator 310, the controller 320 transmits the terminal information of the new terminal device 300 which is pre-stored in the storage 330 to the first terminal device. Thereafter, if the controller 320 receives the authentication information for accessing the AP 400 from the second terminal device, the controller 320 performs the authentication process for registration with the AP 400 based on the received authentication information.

Here, the first and second terminal devices may be the terminal devices that are registered with the AP 400.

Specifically, if the controller 320 receives the authentication information for the AP 400 registration from the second terminal device, the controller 320 transmits a signal for a registration request to the AP 400 through the communicator 310. Thereafter, if the controller 320 receives the request signal for the authentication information from the AP 400, the controller 320 transmits the authentication information received from the second terminal device to the AP 400. The AP 400 then determines whether or not the authentication information received from the new terminal device 300 matches the pre-stored authentication information are matched to determine whether or not the new terminal device 300 is registered.

When the new terminal device 300 is registered with the AP 400 through the procedures described above, the new terminal device 300 may perform data communication with at least one of the electronic apparatus 100 and the authentication terminal device 200 through the AP 400.

Hereinafter, a control method of an electronic apparatus 100 and a new terminal device 300 according to an exemplary embodiment will be described in detail.

Figure 7:
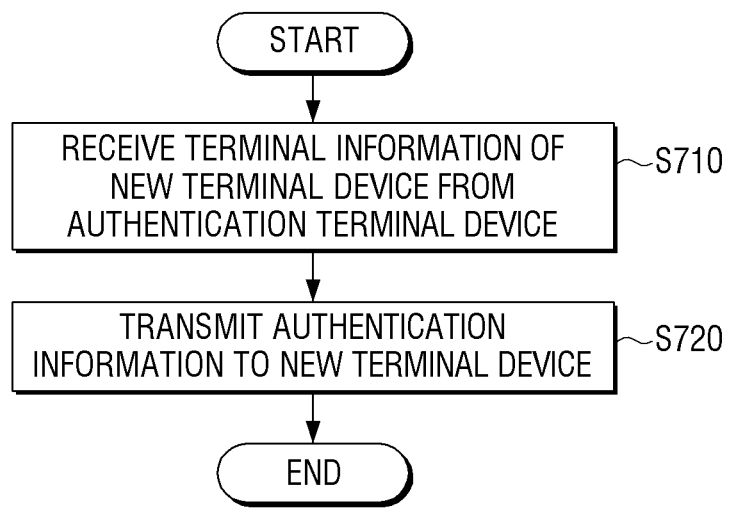
FIG. 7 is a flow diagram illustrating a method in which the electronic apparatus provides authentication information for an AP registration to the new terminal device according to an exemplary embodiment.

FIG. 7 is a flow chart illustrating a method in which the electronic apparatus provides the authentication information for registration with the AP to the new terminal device according to an exemplary embodiment.

As illustrated in FIG. 7, if the electronic apparatus 100 receives the terminal information of the new terminal device 300 from the authentication terminal device 200 that is registered with the AP 400 (S710), the electronic apparatus 100 transmits pre-stored authentication information to the new terminal device 300 based on the received terminal information (S720). Here, the authentication information, which is information for accessing the AP 400, may include subsystem identification (SSID) and key information.

Specifically, the authentication terminal device 200 detects whether or not one or more terminal devices are present within a preset distance or are in contact with the authentication terminal device 200. As a result of the detection, if the new terminal device 300 is present within the preset distance or is in contact with the authentication terminal device 200, the authentication terminal device 200 transmits a signal to the new terminal device 300 requesting the terminal information of the new terminal device 300. Therefore, the new terminal device 300 transmits its own terminal information to the authentication terminal device 200 and the authentication terminal device 200 transmits the terminal information received from the new terminal device 300 to the electronic apparatus 100.

If the terminal information of the new terminal device 300 described above is received through the AP 400, the electronic apparatus 100 transmits the pre-stored authentication information for accessing the AP 400 to the new terminal device 300 based on the terminal information received from the authentication terminal device 200.

Therefore, the new terminal device 300 performs the authentication for registering with the AP 400 based on the authentication information received from the electronic apparatus 100. Specifically, the new terminal device 300 transmits the authentication information to the AP 400 to request registration with the AP 400. The AP 400 then determines whether or not the authentication information received from the new terminal device 300 matches the pre-stored authentication information to determine whether or not the new terminal device 300 is registered.

When the new terminal device 300 is registered with the AP 400 through the procedures described above, the new terminal device 300 may perform data communication with at least one of the electronic apparatus 100 and the authentication terminal device 200 through the AP 400.

Figure 8:
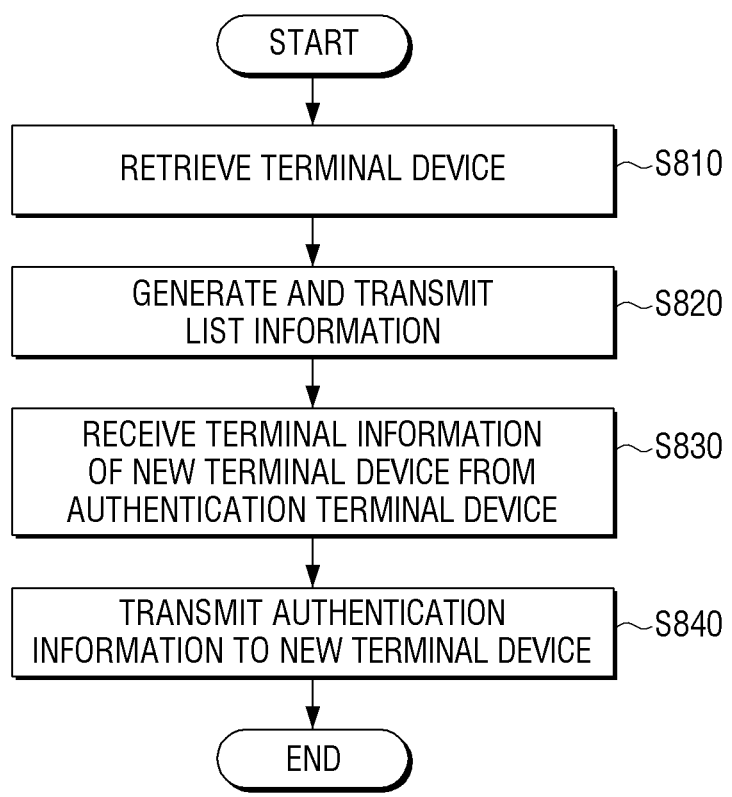
FIG. 8 is a flow diagram illustrating a method in which the electronic apparatus provides authentication information for an AP registration to the new terminal device according to another exemplary embodiment.

FIG. 8 is a flow chart illustrating a method in which the electronic apparatus provides the authentication information for the AP registration to the new terminal device according to another exemplary embodiment.

As illustrated in FIG. 8, the electronic apparatus 100 retrieves terminal devices that may perform data communication with the electronic apparatus 100 (S810). Thereafter, the electronic apparatus 100 generates list information on the retrieved terminal devices and transmits the generated list information to the authentication terminal device 200, which is registered with the AP 400 (S820). Thereafter, when the electronic apparatus 100 receives the terminal information of the new terminal device 300 from the authentication terminal device 200 (S830), the electronic apparatus 100 transmits pre-stored authentication information for registration with the AP 400 registration to the new terminal device 300 based on the received terminal information (S840).

Specifically, the electronic apparatus 100 transmits a signal for requesting the terminal information of the terminal device in a broadcast scheme in order to retrieve one or more terminal devices that may perform data communication with the electronic apparatus 100 and are within the radius of wireless communication. Therefore, one or more terminal devices receiving the signal for the terminal information request transmit the terminal information to the electronic apparatus 100. Here, the terminal information may include address information, identification information, product information, and the like of the terminal device.

If the electronic apparatus 100 receives the terminal information described above from one or more terminal devices, the electronic apparatus 100 generates list information for one or more terminal devices that may perform data communication with the electronic apparatus 100 and are within the radius of wireless communications of the electronic apparatus 100, based on the received terminal information. Thereafter, the electronic apparatus 100 transmits the pre-generated list information to the authentication terminal device 200 through the AP 400.

The authentication terminal device 200 receiving the list information generates a list UI based on the list information and displays the generated list UI on a screen. If the user then inputs a selection instruction for the new terminal device 300 from the list UI displayed on the authentication terminal device 200, the authentication terminal device 200 transmits the terminal information of the new terminal device 300 to the electronic apparatus 100 through the AP 400. Here, the terminal information of the new terminal device 300 may be identification information on the new terminal device 300.

If the electronic apparatus 100 receives the identification information described above, the electronic apparatus 100 obtains the terminal information including the identification information received from the authentication terminal device 200 with reference to the pre-stored terminal information and transmits the authentication information to the new terminal device 300 based on the obtained terminal information.

Therefore, the new terminal device 300 performs the authentication for the AP 400 registration based on the authentication information received from the electronic apparatus 100. Specifically, the new terminal device 300 transmits the authentication information to the AP 400 to request registration with the AP 400. Therefore, the AP 400 determines whether or not the authentication information received from the new terminal device 300 matches the pre-stored authentication information to determine whether or not the new terminal device 300 is registered.

When the new terminal device 300 is registered with the AP 400 through the procedures described above, the new terminal device 300 may perform data communication with at least one of the electronic apparatus 100 and the authentication terminal device 200 through the AP 400.

In addition, the electronic apparatus 100 described above may perform an operation for the authentication terminal device 200 according to the user instruction. Hereinafter, a method for providing, by the electronic apparatus 100, the terminal information of the new terminal device 300 to one or more terminal devices which are registered with the AP 400 will be described in detail.

Figure 9:
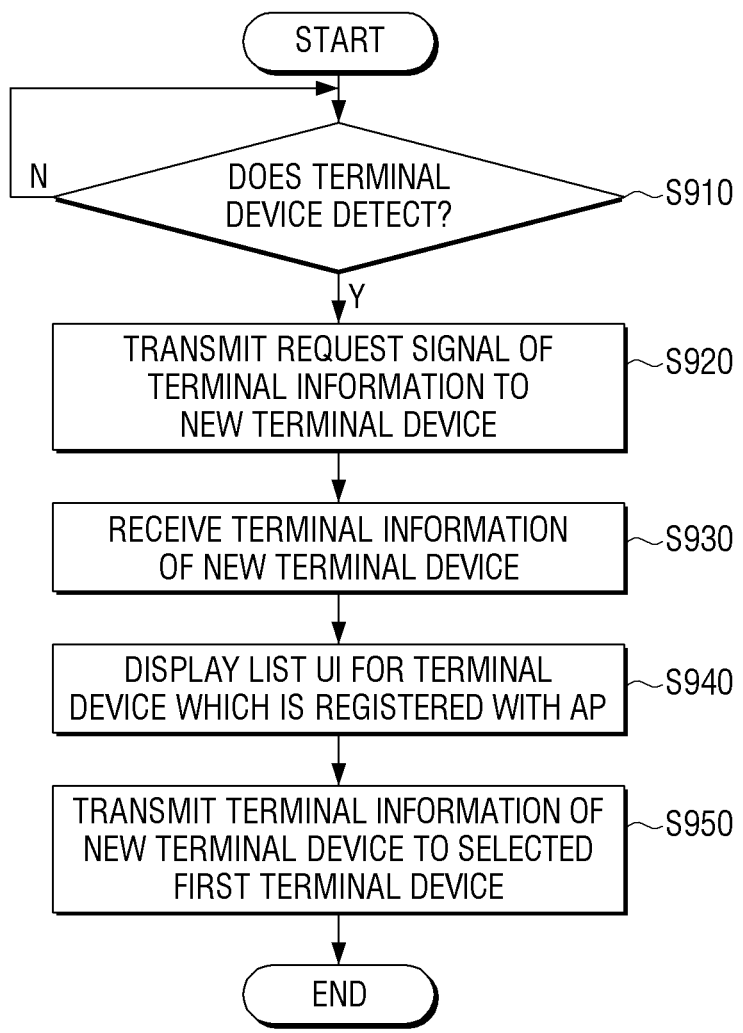
FIG. 9 is a flow diagram illustrating a method in which the electronic apparatus provides terminal information of the new terminal device according to an exemplary embodiment.

FIG. 9 is a first flow chart illustrating a method in which the electronic apparatus provides the terminal information of the new terminal device according to an exemplary embodiment.

As illustrated in FIG. 9, the electronic apparatus 100 determines whether or not one or more terminal devices are located within a preset threshold distance (S910). As a result of the determination, if the new terminal device 300 among one or more terminal devices is located within the preset threshold distance, the electronic apparatus 100 transmits the signal to the new terminal device 300 requesting the terminal information of the new terminal device 300 (S920). Thereafter, the electronic apparatus 100 receives the terminal information of the new terminal device 300 from the new terminal device 300 (S930), and the electronic apparatus 100 displays a list UI for the terminal device that is registered with the AP 400 on a screen (S940). Here, the terminal information of the new terminal device 300 may include address information, identification information, product information, and the like of the new terminal device 300.

If the selection instruction for a first terminal device among one or more terminal devices is input in a state in which the list UI described above is displayed, the electronic apparatus 100 transmits the terminal information of the new terminal device 300 to the first terminal device through the AP 400.

The first terminal device may then transmit the pre-stored authentication information for accessing the AP 400 to the new terminal device 300 based on the terminal information of the new terminal device 300 received through the AP 400.

Figure 10:
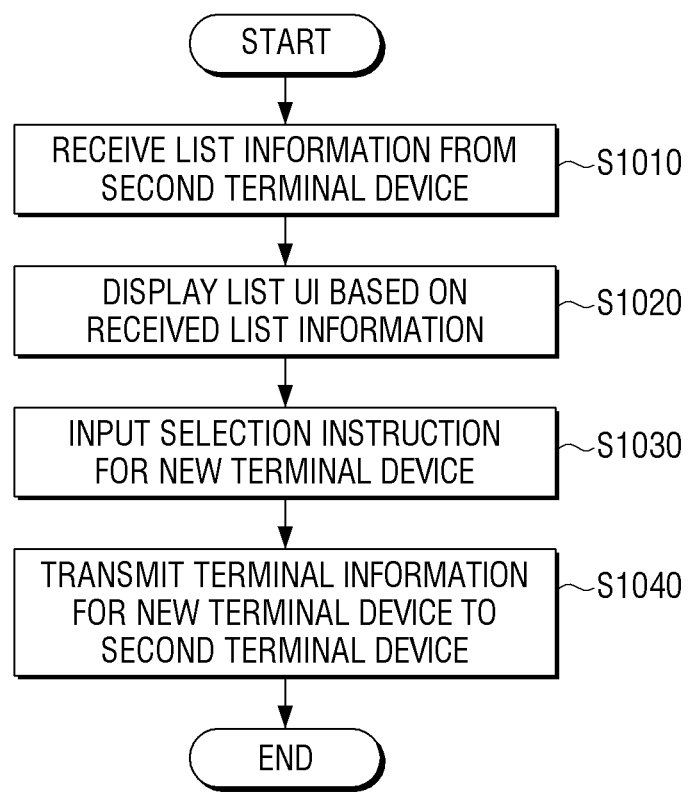
FIG. 10 is a flow diagram illustrating a method in which the electronic apparatus provides terminal information of the new terminal device according to another exemplary embodiment.

FIG. 10 is a flow chart illustrating a method in which the electronic apparatus provides the terminal information of the new terminal device according to another exemplary embodiment.

As illustrated in FIG. 10, if the electronic apparatus 100 receives the list information from the second terminal device among one or more terminal devices that are registered with the AP 400 through the AP 400 (S1010), the electronic apparatus 100 generates the list UI based on the received list information and displays the generated list UI on the screen (S1020). Here, the list information received from the second terminal device is information retrieved by the second terminal device on one or more terminal devices that are within the radius of wireless communications.

If the selection instruction for the new terminal device 300 is input in a state in which the list UI described above is displayed (S1030), the electronic apparatus 100 transmits the terminal information on the new terminal device to the second terminal device through the AP 400 (S1040). Here, the terminal information on the new terminal device may be identification information.

Therefore, the second terminal device may obtain the terminal information associated with the identification information on the new terminal device received from the electronic apparatus 100 with reference to the terminal information on one or more terminal devices that are temporarily stored and are within the radius of wireless communication, and may transmit the pre-stored authentication information to the new terminal device 300 based on the obtained terminal information.

Figure 11:
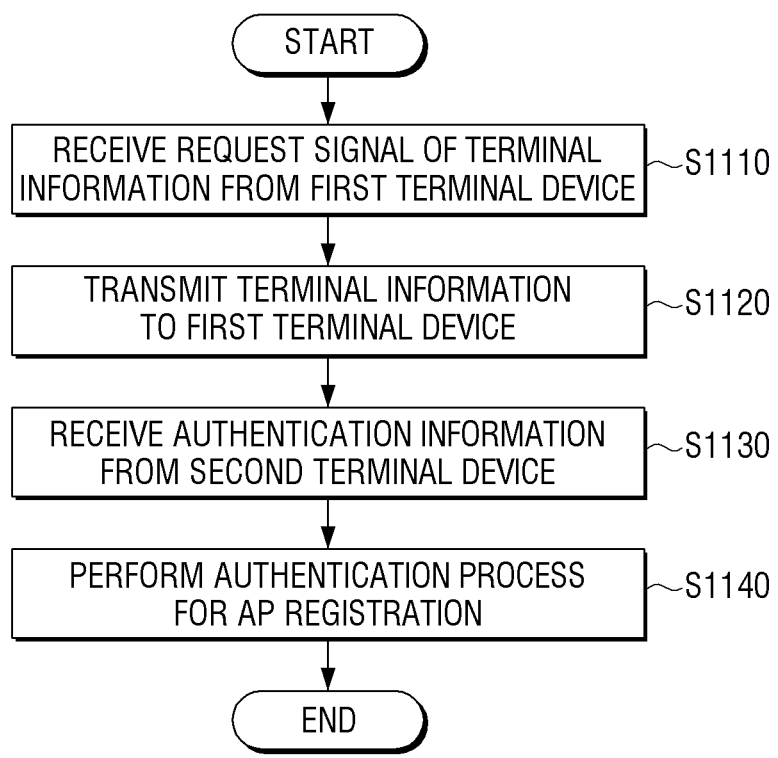
FIG. 11 is a flow diagram illustrating a method for an AP registration in an electronic apparatus according to an exemplary embodiment.

FIG. 11 is a flow chart of a method for an AP registration in an electronic apparatus according to an exemplary embodiment.

As illustrated in FIG. 11, the electronic apparatus may be the new terminal device 300 described above. If the new terminal device 300 described above receives the request signal of the terminal information from the first terminal device that is registered with the AP 400 (S1110), the new terminal device 300 transmits the terminal information of the new terminal device 300 to the first terminal device (S1120). Specifically, if the new terminal device 300 is located within a preset distance or is in contact with the first terminal device, the first terminal device, which is registered with the AP 400, transmits a signal for requesting terminal information to the new terminal device 300. Therefore, the new terminal device 300 may transmit the terminal information of the new terminal device 300 to the first terminal device.

Thereafter, if the new terminal device 300 receives the authentication information for registration with the AP 400 from the second terminal device, which is registered with the AP 400 (S1130), the new terminal device 300 performs an authentication process for the AP 400 registration (S1140).

Specifically, if the new terminal device 300 receives the authentication information from the second terminal device, the new terminal device 300 transmits a signal for a registration request to the AP 400. Thereafter, if the new terminal device 300 receives the request signal from the AP 400 for the authentication information, the new terminal device 300 transmits the authentication information received from the second terminal device to the AP 400. Therefore, the AP 400 determines whether or not the authentication information received from the new terminal device 300 matches the pre-stored authentication information to determine whether or not the new terminal device 300 is registered.

When the new terminal device 300 is registered with the AP 400 through the procedures described above, the new terminal device 300 may perform data communication with at least one of the electronic apparatus 100 and the authentication terminal device 200 through the AP 400.

According to various exemplary embodiments as described above, configuration of a home network may be more easily and rapidly performed to configure an electronic apparatus that is not registered with the AP so that it may communicate through the AP. Although exemplary embodiments have been described with reference to a home network, other exemplary embodiments may likewise apply to different types of networks as well, such as office networks and the like.

Exemplary embodiments have been described above.

Although the exemplary embodiments have been disclosed for illustrative purposes, those skilled in the art will appreciate that various modifications, additions and substitutions are possible, without departing from the scope and spirit of the inventive concept. Accordingly, such modifications, additions and substitutions should also be understood to fall within the scope of the inventive concept.

What is claimed is:

1. An audio output apparatus comprising:
   a communicator circuit configured to perform data communications with at least one terminal device registered with an access point (AP);
   a memory configured to store information of the audio output apparatus; and
   a controller configured to, in response to a request for the information of the audio output apparatus from a first terminal device, control the communication circuit to transmit the stored information of the audio output apparatus to the first terminal device, and in response to authentication information for AP registration being received from a second terminal device, perform authentication processing for the AP registration based on the received authentication information.

2. The apparatus as claimed in claim 1, wherein the communicator circuit comprises:
   a first communicator circuit configured to perform data communication with at least one terminal device located within a preset distance; and
   a second communicator circuit configured to perform data communication with the AP and the at least one terminal device registered with the AP.

3. The apparatus as claimed in claim 2, wherein:
   the controller is configured to control the second communicator circuit to, in response to the authentication information being received from the second terminal device through the first communicator circuit, transmit a request for the AP registration, and in response to a request for the authentication information from the AP, transmit the authentication information to the AP; and
   the AP performs registering of the audio output apparatus according to whether the authentication information received from the audio output apparatus is the same as prestored authentication information.

4. The apparatus as claimed in claim 1, wherein the authentication information includes subsystem identification (SSID) and key information for the AP registration.

5. The apparatus as claimed in claim 1, wherein the first terminal device, in response to the information of the audio output apparatus being received from the audio output apparatus, transmits the information of the audio output apparatus to a terminal device selected by a user from among a plurality of terminal devices registered with the AP.

6. The apparatus as claimed in claim 5, wherein the second terminal device transmits the authentication information for the AP registration prestored in the second terminal device to the audio output apparatus based on the information of the audio output apparatus received from the first terminal device.

7. A method for controlling an audio output apparatus, the method comprising:
   in response to a request for information of the audio output apparatus from a first terminal device registered with an access point (AP), transmitting prestored information of the audio output apparatus to the first terminal device;
   receiving authentication information for AP registration prestored in a second terminal device from the second terminal device registered with the AP; and
   performing an authentication process for the AP registration based on the received authentication information.

8. The method as claimed in claim 7, further comprising:
   performing data communications with at least one terminal device located within a preset distance through a first communicator of the audio output apparatus; and
   performing data communications with the AP and at least one terminal device registered with the AP through a second communicator of the audio output apparatus.

9. The method as claimed in claim 8, wherein the performing the authentication process comprises:

in response to the authentication information being received from the second terminal device, transmitting a request for the AP registration through the second communicator; and in response to a request for the authentication information from the AP, transmitting the authentication information to the AP through the second communicator, wherein the AP performs registering of the audio output apparatus according to whether the authentication information received from the audio output apparatus is the same as prestored authentication information.

10. The method as claimed in claim 7, wherein the authentication information includes subsystem identification (SSID) and key information for the AP registration.

11. The method as claimed in claim 7, wherein the first terminal device, in response to the information of the audio output apparatus being received from the audio output apparatus, transmits the information of the audio output apparatus to a terminal device selected by a user from among a plurality of terminal devices registered with the AP.

12. The method as claimed in claim 11, wherein the second terminal device transmits the authentication information for the AP registration prestored in the second terminal device to the audio output apparatus based on the information of the audio output apparatus received from the first terminal device.

13. The apparatus as claimed in claim 1, wherein the information of the audio output apparatus includes at least one of address information, identification information and product information of the audio output apparatus.

14. The method as claimed in claim 7, wherein the information of the audio output apparatus includes at least one of address information, identification information and product information of the audio output apparatus.

* * * * *